United States Patent Office

Re. 25,043
Reissued Sept. 26, 1961

25,043

ANTI-BIOFOULING COPPER-BASE ALLOY

Carl L. Bulow, Trumbull, Conn., assignor to Bridgeport Brass Company, Bridgeport, Conn., a corporation of Connecticut No Drawing. Original No. 2,887,375, dated May 19, 1959, Ser. No. 557,441, Jan. 5, 1956. Application for reissue Feb. 26, 1960, Ser. No. 11,397
11 Claims. (Cl. 75—157.5)

Matter enclosed in heavy brackets [ ] appears in the original patent but forms no part of this reissue specification; matter printed in italics indicates the additions made by reissue.

This invention relates generally to copper-base alloys and more particularly to copper-base alloys having superior characteristics with respect to biofouling and corrosion effects. This application is a continuation-in-part of the copending application Serial No. 511,107, filed May 25, 1955 *now Patent 2,887,374.*

In the classification of copper alloys, the current practice is to use the term "bronze" for all copper-base alloys of less than 98% copper containing alloying elements other than zinc, and the term "brass" for all copper-base alloys of copper and zinc in various proportions containing less than 98% copper. Other metals may be present in brass but in such small quantities that their effect is subordinate to that of zinc. In the present disclosure, where the alloy contains over 98% of copper, it will be identified simply as "98% copper base."

Other elements present in the "brass" system of alloys are either impurities which were not removed during processing or are those intentionally added for specific purposes. Thus tin is frequently added to copper-zinc systems in varying concentrations to improve its corrosion resistance and to increase its strength and hardness.

Copper base alloys are widely used for the construction of apparatus subjected to corrosive solutions. For example, in the manufacture of condenser and heat exchange tubes, marine hardware and shafts, sheathing, valves and other elements which come in contact with sea water, it is conventional to make use of copper-zinc alloys such as Muntz metal, Admiralty metal or aluminum brass. Brass is also employed for fresh water supply lines and tanks, as well as in industrial and chemical plant equipment involving exposure to a wide variety of acid and saline solutions. Bronzes are also used under conditions involving corrosive solutions, aluminum bronze for example being conventionally employed for propeller blades and silicon bronze for hot water tanks.

Copper-base alloys are susceptible to various types of corrosion which gradually weaken the alloy and ultimately result in service failure. One type of corrosion failure is commonly referred to as dezincification. Dezincification occurs due to a complex electrolytic action giving rise to a gradual removal of the zinc from the surface of the metal and the deposition of a more or less spongy copper in place of the alloy. Such corrosion takes place in some instances in a relatively uniform manner over the surface of the brass or bronze tube and at other times in isolated areas where the dezincification is intensified, thereby pitting and eventually penetrating the tube wall to produce a leak therein. This intensified form of corrosion is usually referred to as "plug type" dezincification. The attack on metal by flowing water is further augmented by the turbulence of the liquid, resulting in so-called impingement corrosion.

Conditions conducive to stress corrosion failure, or as it is more commonly called, "season cracking," are the presence of internal stress gradients in the alloy, followed by exposure to ammonia or ammoniacal compounds. Such exposure occurs where the copper-base alloy tube is in contact with natural waters (fresh or salt) whereby an algal film or slime is gradually formed on the surface of the metal. The formation of an organic slime on metal is generally designated biofouling. As is well known, algae has a high protein content, and upon decomposition thereof ammonia products are released. Hence, a brass tube in natural water is subject to corrosion due to biofouling as well as the usual corrosion effect resulting from the chemical action of a saline or mineral solution and brass. An extensive discussion of the corrosive effect of marine flora and fauna on copper-base alloys may be found in the article of C. L. Bulow, entitled "Corrosion and Biofouling of Copper-Base Alloys in Sea Water," appearing in the Transactions of the Electrochemical Society, volume 87, 1945, pages 319 to 352. In this article, the test results are given for a total of 240 test pieces of copper alloys of widely varied composition. These pieces are exposed to clean flowing sea water for periods of six to twelve months, during which the water temperature ranges between 2° and 30° C. All of the specimens were covered with slime after a few months exposure.

While it is known to add a small amount of arsenic to a copper alloy to reduce dezincification effect, the addition of arsenic does not materially inhibit the formation of algae on the surface of the metal. Indeed, in some instances, arsenic has been found to have the reverse effect and appears to attract certain forms of marine organisms.

The formation of algae or bacterial slimes on the surface of a copper-base alloy tube not only contributes toward corrosion but also impairs the heat transfer properties of the tube. A slime formation on the wall of a tube acts as a heat insulator, hence where the tube is incorporated in a heat exchanger, this factor materially lowers the efficiency of the system. Heretofore, it has been necessary to chlorinate the system to retard or prevent the formation of algae.

Accordingly, it is the principal object of the invention to produce a copper-base alloy which has superior resistance to corrosion and biofouling effects.

More particularly, it is an object of the invention to provide a brass or bronze alloy including an algae inhibiting agent.

Still another object of the invention is to provide a brass or bronze alloy characterized by a reduction in the tendency toward dezincification, a reduction in the rate of impingement attack as well as a reduction in the amount of biofouling.

Broadly stated, a copper-base alloy in accordance with the invention further includes a small amount of mercury, preferably in the range of .001 to 1%. More specifically a brass alloy in accordance with the invention is constituted by copper in the range of approximately 60 to 85%, zinc in the range of approximately 15 to 40% and mercury in the range of approximately .001 to 1%. *The invention also includes a copper-nickel-mercury alloy in which mercury is present in the approximate range of from .001 to 1%, nickel is present up to a maximum of approximately 29%, with the balance being copper.*

Due to the volatility of mercury, it cannot readily be directly introduced into the molten brass or bronze since the mercury will quickly vaporize and be driven off. Accordingly, the preferred technique for forming a copper-base-mercury alloy is by the process of amalgamation. In the case of brass an amalgam is first produced by treatment of copper or zinc with a solution of mercury salt under conditions such as to precipitate metallic mercury on the surface of the metal. This is accomplished, for example, by soaking small particles or chips of zinc or copper in a mercurous nitrate solution having a small amount of nitric acid added thereto, whereby metallic mercury is precipitated on the surface of the chips by electrolytic exchange. No electrical current is required for this purpose.

The mercury so deposited forms a superficial amalgam on the surface of the chips. The mercury-plated chips are washed and dried and thereafter are introduced to the molten base metal to form the desired alloy. The ratio of mercury to copper and zinc may be controlled by the relative amount of chips introduced into the molten metal. Alternatively, the alloy may be formed by the use of zinc, copper, or copper alloy containing a small amount of mercury as a natural impurity or alloying element. The same procedure described hereinabove may be used to introduce mercury into copper-base alloys of the bronze type and in the other copper-base alloy examples set forth in Table 1 hereinafter.

It has been found that the addition of mercury to copper-base alloys produces a substantial improvement in general corrosion resistance and impingement corrosion towards sea water as well as improved resistance towards dezincification. The inclusion of mercury in brass compositions has been found to have very significantly reduced the extent of biofouling by various marine organisms. Even such alloys as high brass and Admiralty, which are generally subject to biofouling by algae and bacterial slimes, remain very clean and brassy-bright when incorporating mercury. Residual slime clinging to the surfaces adheres poorly thereto and can be much more readily rinsed from the surface when the alloy includes mercury as disclosed herein.

In Table 1, examples are disclosed of alloys in accordance with the invention, the main constituent of the alloys being set forth in percentage values. In order to provide a basis for comparison of the characteristics of the alloys in accordance with the invention with similar alloys in which mercury is absent, Table 1 also includes under each example a conventional mercury-free alloy whose constituents otherwise have about the same relative percentages. Examples D, E, F, G and H are closely related with respect to the relative proportions of copper and zinc, hence these examples are compared with but one similar mercury-free alloy. Examples J and K are closely related with respect to the relative proportions of copper and phosphor, hence they are compared with but one similar mercury-free alloy.

TABLE 1

(In percentages)

| | |
|---|---|
| Example A | Cu 65.03—Zn 34.95—Hg .04. |
| High Brass | Cu 65.92—Zn 34.81—Hg .00. |
| Example B | Cu 60.16—Zn 39.83—Hg .07. |
| Muntz metal | Cu 59.75—Zn 40.23—Hg .00. |
| Example C | Cu 71.14—Zn 27.84—Sn .96—Hg .05. |
| Admiralty | Cu 71.10—Zn 27.98—Sn .97—Hg .00. |
| Example D | Cu 71.44—Zn 28.28—Hg .10. |
| Example E | Cu 71.05—Zn 28.88—Hg .06. |
| Example F | Cu 69.08—Zn 30.91—Hg .004. |
| Example G | Cu 69.00—Zn 30.99—Hg .008. |
| Example H | Cu 69.37—Zn 30.51—Hg .04. |
| 70/30 Brass | Cu 70.21—Zn 29.78—Hg .00. |
| Example I | Cu 84.70—Zn 15.29—Hg .008. |
| Red Brass | Cu 84.55—Zn 15.44—Hg .00. |
| Example J | Cu 99.9—P .025—Hg .005. |
| Example K | Cu 99.9—P .038—Hg .010. |
| 98% Copper Base | Cu 99.9—P .008—Hg .000. |
| Example L | Cu 70.31—Zn .02—Ni 29.21—Fe 0.47—Hg .010. |
| Cupro-Nickel | Cu 69.71—Zn .05—Ni 29.08—Fe 0.52—Hg .000. |
| Example M | Cu 97.84—Si 2.01—Hg .01. |
| Silicon-Bronze | Cu 98.06—Si 1.93—Hg .00. |
| Example N | Cu 94.80—Al 5.19—Hg .02. |
| Aluminum-Bronze | Cu 94.97—Al 5.02—Hg .00. |
| Example O | Cu 94.30—Zn .01—Sn 5.36—P .19—Hg .02. |
| Phosphor-Bronze | Cu 94.32—Zn .02—Sn 5.58—P .068—Hg .00. |

In Table 2 below, the rates of corrosion and the depth of pitting for the mercury containing Examples A to I versus the related mercury-free alloys are tabulated, the rates being determined after five years' exposure to Atlantic Ocean water. The rates of corrosion tabulated in Table 2 are expressed in mils per year calculated from the loss in weight and loss in tensile strength for these particular alloys. In addition, the depth of pitting or plug type dezincification found in these specimens at the end of five years' exposure is also tabulated.

TABLE 2

| Alloy | Weight [1] | Tensile Strength [2] | Pitting [3] |
|---|---|---|---|
| Example A (Hg .04%) | 0.18 | 0.25 | 7.2 |
| High Brass (Hg nil) | 0.53 | 0.78 | 10.0 (p.t.d) |
| Example B (Hg .07%) | 0.66 | 2.60 | 0.0 |
| Muntz Metal (Hg nil) | 2.70 | [4] 8.35 | 0.0 |
| Example C (Hg .05%) | .32 | .30 | 3.9 |
| Admiralty (Hg nil) | .37 | .36 | 14.0 (p.t.d) |
| Example D (Hg .10%) | .26 | .37 | 3.8 |
| Example E (Hg .06%) | .16 | .28 | 7.9 |
| Example F (Hg .004%) | .26 | .47 | 0.8 |
| Example G (Hg .008%) | .28 | .13 | 0.8 |
| Example H (Hg .04%) | .23 | .23 | 5.3 |
| 70/30 Brass (Hg nil) | .26 | .68 | 13.5 (p.t.d) |
| Example I (Hg .008%) | .45 | .49 | 7.6 |
| Red Brass (Hg nil) | .44 | .45 | 11.5 |
| Example J (Hg .005) | .50 | .60 | 7.0 |
| Example K (Hg .010) | .48 | .74 | 7.9 |
| 98% Copper Base (Hg nil) | .46 | .53 | 9.5 |
| Example L (Hg .010) | .11 | .08 | 0.0 |
| Cupro-Nickel (Hg nil) | .36 | .23 | 9.8 |
| Example M (Hg .010) | .40 | .41 | 10.0 |
| Silicon-Bronze (Hg nil) | .37 | .49 | 17.0 |
| Example N (Hg .02) | .18 | .59 | 1.7 |
| Aluminum-Bronze (Hg nil) | .33 | 1.44 | 3.5 |
| Example O (Hg .02) | .43 | .25 | 7.5 |
| Phosphor-Bronze (Hg nil) | .44 | .54 | 11.0 |

NOTE.—All values are the average of six or more tests.
[1] Penetration in mils per year calculated from loss in weight.
[2] Penetration in mils per year calculated from loss in tensile strength.
[3] Depth of pitting or plug type dezincification (p.t.d) in five years.
[4] Layer type dezincification.

In Table 3 below there is presented data regarding the rate of impingement corrosion for the mercury containing examples versus related mercury-free alloys. These values were determined after six months' exposure to flowing Atlantic Ocean water, flowing at a velocity of about two and a half feet per second.

TABLE 3

| Alloy | Rate of Impingement in mils per year |
|---|---|
| Example A (Hg .04%) | 1.4 |
| High Brass (Hg nil) | 11.2 |
| Example B (Hg .07%) | 1.4 |
| Muntz Metal (Hg nil) | 1.5 |
| Example C (Hg .05%) | 6.6 |
| Admiralty (Hg nil) | 23.7 |
| Example D (Hg .10%) | 2.2 |
| Example E (Hg .06%) | 1.6 |
| Example F (Hg .004%) | 2.9 |
| Example G (Hg .008%) | 6.7 |
| Example H (Hg .04%) | 2.2 |
| 70/30 Brass (Hg nil) | 12.5 |
| Example I (Hg .008%) | 6.2 |
| Red Brass (Hg nil) | 17.7 |
| Example J | 12.5 |
| Example K | 6.0 |
| 98% Copper Base | 27.0 |
| Example L | .08 |
| Cupro-Nickel | 2.2 |
| Example M | 13.6 |
| Silicon-Bronze | 30.5 |
| Example N | 3.5 |
| Aluminum-Bronze | 19.6 |
| Example O | 7.3 |
| Phosphor-Bronze | 13.0 |

To demonstrate more specifically the effectiveness of mercury as a dezincification inhibitor in brasses, Table 4 presents data showing the improved resistance to dezincification by brasses containing mercury versus mercury-free brasses. In a 1.0% cupric chloride solution, the loss in weight for mercury-containing and mercury-free brass is not substantially different, but the loss in tensile strength, which is due to dezincification, is markedly altered by the presence of mercury. This difference is brought out through the use of a ratio of rate of corrosion based on loss in tensile strength to the rate of corrosion based on loss in weight. When this ratio approaches unity (1.0) uniform corrosion free from dezincification is indicated. The data in Table 4 reveals that mercury in brass does act to a considerable degree as an effective inhibitor of dezincification.

TABLE 4

Data showing improved resistance to dezincification by brasses containing mercury versus mercury-free brasses in 1% cupric chloride solution (78 day test):

| Alloy | Rate of Corrosion Based on Loss in (wt.) | Loss in Tensile Strength (T.S.) | Ratio, T.S./wt. |
|---|---|---|---|
| Example A (Hg .04%) | .0132 ipy. | .0138 ipy. | 1.0 |
| High Brass (Hg nil) | .0158 ipy. | .0644 ipy. | 4.0 |
| Example B (Hg .07%) | .1031 | .01805 | 1.4 |
| Muntz Metal (Hg nil) | .0153 | .1013 | 6.6 |
| Example C (Hg .05%) | .0136 | .0235 | 1.7 |
| Admiralty (Hg nil) | .0130 | .06875 | 5.3 |
| Example D (Hg .10%) | .01345 | .01385 | 1.0 |
| 70/30 Brass (Hg nil) | .0139 | .0672 | 4.8 |

The data in the above tables indicate that the addition of mercury to high brass, Muntz metal and 70/30 brass results in a substantial improvement in general corrosion resistance and impingement corrosion towards sea water. Brass alloys also have improved resistance towards dezincification. The addition of mercury to Admiralty metal improves the resistance of this alloy towards dezincification and impingement corrosion. In the cases of phosphor bronze and silicon bronze, the addition of mercury results in some improvement in general corrosion resistance; that is to say, the corrosion is more uniform and somewhat lower. Adding mercury to these alloys also improves the impingement corrosion resistance. The addition of mercury to the copper base metal and red brass gives rise to more uniform general corrosion, although at a slightly higher rate. The addition of mercury to cupro nickel and aluminum bronze produces a substantial improvement in general corrosion, impingement corrosion and corrosion pitting. Thus, in all instances, a beneficial effect is obtained.

Having thus set forth the nature of the invention, what is claimed is:

1. A copper base alloy having improved resistance characteristics with respect to corrosion by natural waters, said alloy consisting essentially of copper in the range of approximately 59–85%, zinc in the range of approximately 15–40% and mercury in the range of approximately .001 to 1%.

2. An anti-biofouling Muntz metal alloy adapted for exposure to corrosive solutions and consisting essentially of approximately 59% of copper, approximately 40% of zinc and mercury in a relative amount not in excess of 1% and not less than .001%.

3. An anti-biofouling Muntz metal alloy *tube* adapted to resist corrosion in natural waters, said tube consisting essentially of approximately 59% of copper, approximately 40% zinc, and mercury in an approximate range of .001 to 1%.

4. An anti-biofouling high brass alloy adapated for exposure to corrosive solutions and consisting essentially of approximately 65% copper, approximately 34% of zinc, and mercury in a relative amount not in excess of 1% and not less than .001%.

5. An anti-biofouling copper base alloy adapted for exposure to corrosive solutions and consisting essentially of approximately 70% of copper, approximately 29% of zinc, and mercury in a relative amount not in excess of 1% and not less than .001%.

6. A 70/30 brass alloy tube adapted to resist corrosion when exposed to natural waters and consisting essentially of copper, zinc and mercury in relative amounts of approximately 70%, 29% and 0.1%, respectively.

7. A system for conducting fluids through metallic pipes exposed to natural waters, said system comprising pipes formed of an anti-biofouling alloy consisting essentially of a copper in the range of approximately 60–85%, zinc in the range of approximately 15–40% and mercury in the range of .001 to 1.0%, and means circulating natural waters about said pipes.

8. An anti-biofouling admiralty metal consisting essentially of approximately 70% of copper, approximately 28% of zinc, approximately 1% of tin and mercury in an amount not in excess of 1% and not less than .001%.

9. An anti-biofouling red brass alloy adapted for exposure to corrosive solutions and consisting essentially of approximately 84% of copper, approximately 15% of zinc, and mercury in an amount not in excess of 1% and not less than .001%.

*10. An anti-biofouling copper base alloy consisting essentially of approximately 70% copper, 29% nickel and mercury in the range of from .001 to 1%.*

*11. An anti-biofouling alloy of copper, nickel, and mercury consisting of mercury in the approximate range of from .001 to 1%, nickel up to a maximum percentage of approximately 29%, with the balance being copper.*

References Cited in the file of this patent or the original patent

| | | |
|---|---|---|
| 77,793 | Wright | May 12, 1868 |
| 130,814 | Macker | Aug. 27, 1872 |
| 1,248,925 | Sandell | Dec. 4, 1917 |
| 2,270,660 | Misfeldt | Jan. 20, 1942 |
| 2,400,566 | Misfeldt | May 21, 1946 |

FOREIGN PATENTS

| | | |
|---|---|---|
| 401,750 | France | Sept. 13, 1909 |